(12) United States Patent
Mohindra

(10) Patent No.: US 6,717,981 B1
(45) Date of Patent: Apr. 6, 2004

(54) TRANSMITTER IMAGE SUPPRESSION IN TDD TRANSCEIVERS

(75) Inventor: Rishi Mohindra, Milpitas, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/460,929

(22) Filed: Dec. 14, 1999

(51) Int. Cl.[7] ................................................ H04B 1/38
(52) U.S. Cl. ......................... 375/219; 455/78; 455/83; 455/69
(58) Field of Search ................................. 375/219, 221, 375/222, 259, 377, 279, 280, 281, 283; 455/76, 78, 83, 88, 24, 69; 370/278, 280, 282, 294

(56) References Cited

U.S. PATENT DOCUMENTS

| | | | |
|---|---|---|---|
| 5,423,076 A | | 6/1995 | Westergren et al. .......... 455/86 |
| 5,446,422 A | * | 8/1995 | Mattila et al. ............... 332/103 |
| 5,896,562 A | * | 4/1999 | Heinonen .................... 455/76 |
| 6,009,124 A | * | 12/1999 | Smith et al. ................. 375/267 |
| 6,163,708 A | * | 12/2000 | Groe ............................. 455/522 |
| 6,278,864 B1 | * | 8/2001 | Cummins et al. ............ 455/73 |
| 6,553,018 B1 | * | 4/2002 | Ichihara ....................... 370/342 |
| 6,404,293 B1 | * | 6/2002 | Darabi et al. ................ 331/37 |

FOREIGN PATENT DOCUMENTS

EP 0624004 A1 11/1994 ........... H04B/1/40

OTHER PUBLICATIONS

Patent Abstract of Japan Publication No.: 10242765A, Date of Publication Sep. 11, 1998.

* cited by examiner

Primary Examiner—Young T. Tse
(74) Attorney, Agent, or Firm—Dicran Halajian

(57) ABSTRACT

In a transceiver comprising a time-division-duplex (TDD) of transmit and receive functions, the characteristics of unwanted image signal energy being transmitted from the transceiver are determined, and thereafter feedback is provided to the transmitter to reduce this unwanted image signal energy. The image signal energy is measured by the receiver component of the transceiver and fed back to the transmitter component of the transceiver. The transmitter component uses the fed back information to adjust the gain and or phase relationship between the quadrature signals that are subsequently quadrature-phase modulated and transmitted. A variety of techniques can be employed to allow the image signal energy to be measured directly by the receiver component. The phase modulation signals at the transmitter can be interchanged, so that the unwanted image signal energy is transmitted in the sideband of the intended signal. Alternatively, the phase modulation signals at the receiver can be interchanged, so that the receiver's operating frequency is shifted from the frequency of the transmitter's intended signal sideband to the frequency of the transmitter's unwanted image signal sideband.

23 Claims, 4 Drawing Sheets

TRANSMITTER IMAGE SUPPRESSION IN TDD TRANSCEIVERS

BACKGROUND OF THE INVENTION

1. Field of the Invention

This invention relates to the field of communications, and in particular to time-division-duplex (TDD) transceivers with a common transmit and receive frequency.

2. Description of Related Art

Time-division-duplex (TDD) transceivers are commonly used to provide two-way communications using a single carrier signal frequency. FIG. 1 illustrates an example block diagram of a conventional time-division-duplex transceiver 100 that utilizes quadrature modulation. The transceiver 100 includes a transmitter 130 that transforms an input data signal into quadrature signals TI 131 and TQ 132. A local oscillator 120 provides an in-phase oscillation signal 121, and a phase shifter 125 provides a quadrature-phase oscillation signal 122 that is 90 degrees out of phase with the in-phase oscillation signal 121. The quadrature signal TI 131 is modulated, at 142, by the in-phase oscillation signal 121, and the quadrature signal TQ 132 is modulated, at 144, by the quadrature-phase oscillation signal 122. The adder 150 combines these modulated signals to produce a composite signal 151.

The transmit/receive switch 160 alternately selects the composite signal 151 for transmission, via an antenna 165. On the alternate cycle, the transmit/receive switch 160 provides an input signal 161 from the antenna 165. Although an antenna 165 is illustrated in FIG. 1 (and FIG. 3), the use of other communications media, such as a wire, or cable, is also common in the art.

The input signal 161 is a composite signal that is segregated into corresponding quadrature signals RI 173 and RQ 175 by demodulators 172 and 174, respectively. Common in the art, the local oscillator 120 that is used to modulate the transmit quadrature signals TI and TQ is used to demodulate the received input signal 161 into receive quadrature signals RI and RQ. A number of advantages are achieved by using a common local oscillator 120. In particular, the local oscillator 120 is typically a phase-locked oscillator, and using the same oscillator 120 during both phases of the transmit/receive switch 160 eliminates the need to re-phase or re-synchronize the oscillator 120 with each transition. Additionally, the use of the same local oscillator 120 provides a material cost savings compared to the use of a separate oscillator for each of the transmit and receive operations. The receiver 110 processes the quadrature signals RI 173 and RQ 175 to provide an output signal 102.

As is common in the art, the transmitter 130 provides the transmit quadrature signals TI 131 and TQ 132 at a predetermined intermediate frequency (IF). In like manner, the quadrature signals RI 173 and RQ 175, being produced by a distant transmitter that is similar to the transmitter 130, are also produced at the predetermined intermediate frequency. The modulation 142, 144 of the quadrature signals TI 131, TQ 132 at the intermediate frequency IF with the local oscillation signals 121, 122 at a carrier frequency Fc results in two sidebands of modulation, one at Fc+IF, and the other at Fc−IF. Ideally, the quadrature signals TI 131 and TQ 132 are structured such that one of the sidebands, the intended sideband, contains maximum power, while the other sideband, the "image" sideband contains minimum power.

Due to component variations and other factors, however, a difference in phase or amplitude from the ideal relationship between the quadrature signals TI 131 and TQ 132 can result in an image sideband having a considerable power content. FIG. 2 illustrates an example spectral power density plot of a convention transmitter 130 having a less-than-ideal relationship of amplitude or phase between the quadrature signals TI and TQ. As illustrated, a majority of power is located at the intended sideband at Fc+IF, at 220, but a considerable amount of power is illustrated at the carrier frequency FC, at 210, and at the image sideband at Fc−IF, at 230. To minimize the distortion of the demodulated intended signal, the transmitter or a distant receiver must filter this unintended and undesirable carrier and image signal power.

As is known in the art, the cost and complexity of a filter process is highly dependent upon the degree of "roll-off" required of the filter. The selective filtering of two signals that are close in frequency requires a very steep roll-off, and therefore is more costly and complex than the selective filter of two signals that are widely separated in frequency. By implication, then, the preferred intermediate frequency IF should be large, because the separation between the intended 220 and unwanted 230 signals is twice the intermediate frequency. However, a high intermediate frequency introduces additional costs and complexities to the components utilized within the transmitter 130 and receiver 110 compared to a lower intermediate frequency. Preferably, the transmitter 130 should be designed to conform as close to the ideal as possible, so that the degree of required filtering at the transmitter or distant receiver can be minimized, and so that a lower intermediate frequency can be utilized. The use of precision components and robust design techniques that provide for this idealized transmitter performance, however, is also a costly and complex approach.

BRIEF SUMMARY OF THE INVENTION

It is an object of this invention to provide a method and apparatus that minimizes the transmission of unwanted image frequency signals from a transceiver. It is a further object of this invention to provide a method and apparatus that minimizes the transmission of unwanted image frequency signals from a transceiver that does not require the use of precision components in the transceiver. It is a further object of this invention to provide a method and apparatus that minimizes the transmission of unwanted image frequency signals from a transceiver that allows for a dynamic adjustment of the transceiver performance to compensate for component variations and environmental changes.

These objects and others are achieved by providing a method and apparatus for determining the characteristics of the image signal energy being transmitted from a transceiver and thereafter providing feedback to the transmitter to reduce this image signal energy. The image signal energy is measured by the receiver component of the transceiver and fed back to the transmitter component of the transceiver. The transmitter component uses the fed back information to adjust the gain and or phase relationship between the quadrature signals that are subsequently quadrature-phase modulated and transmitted. A variety of techniques can be employed to allow the image signal energy to be measured directly by the receiver component. The phase modulation signals at the transmitter can be interchanged, so that the image signal energy is transmitted in the sideband of the intended signal. Alternatively, the phase modulation signals at the receiver can be interchanged, so that the receiver's operating frequency is shifted from the frequency of the transmitter's intended signal sideband to the frequency of the transmitter's image signal sideband.

BRIEF DESCRIPTION OF THE DRAWINGS

The invention is explained in further detail, and by way of example, with reference to the accompanying drawings wherein.

Throughout the drawings, same reference numerals indicate similar or corresponding features or functions.

DETAILED DESCRIPTION OF THE INVENTION

Figure 3:
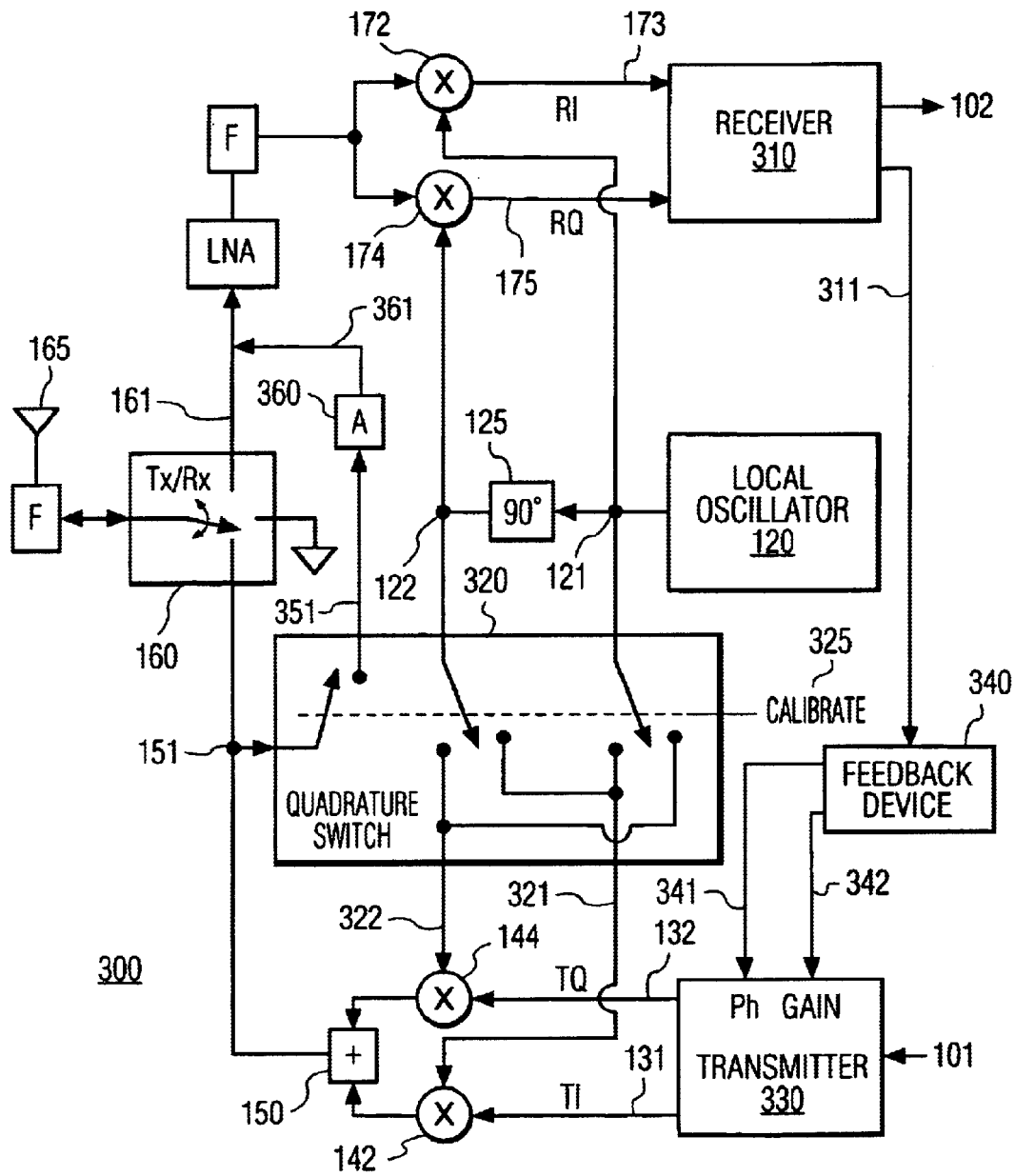
FIG. 3 illustrates an example block diagram of a time-division-duplex transceiver in accordance with this invention.

FIG. 3 illustrates an example block diagram of a time-division-duplex transceiver 300 in accordance with this invention. The transceiver 300 is configured to allow for the receiver 310 of the transceiver 300 to receive the composite transmit signal 151 from the transmitter 330 of the transceiver 300. A switch 320 effects the coupling of the composite signal 151 to the demodulators 172, 174 when a calibrate signal 325 is asserted. Also illustrated is an optional attenuation device 360 that attenuates the switched composite signal 151 to form an attenuated composite signal 361 at a signal strength corresponding to the signal strength of the typical received composite signal 161 from the antenna 165. While in the calibrate mode, the receive/transmit switch 160 decouples the received composite signal 161 from the receive signal path. The receiver 310 provides a characterization signal 311, such as a signal strength indication at one or more select frequencies, that is fed back to the transmitter 330, typically via a feedback device 340. In accordance with this invention, the transmitter 330 includes means for controlling the phase and/or the gain of one or both of the quadrature signals TI 131 and TQ 132, and/or the relative phase of the local oscillation signals 121, 122. Such phase and gain controlling means are common in the art and include voltage or switch controlled phase shifters and variable gain amplifiers and filters. The feedback device 340 is configured to effect the transformation, if any, of the characterization signal 311 to provide the appropriate control signals 341, 342 to effect the change of phase and/or gain in the transmitter 330, and/or the relative phase of the local oscillation signals 121, 122, as determined by the particular characteristics of the selected means for effecting this control.

Figure 1:
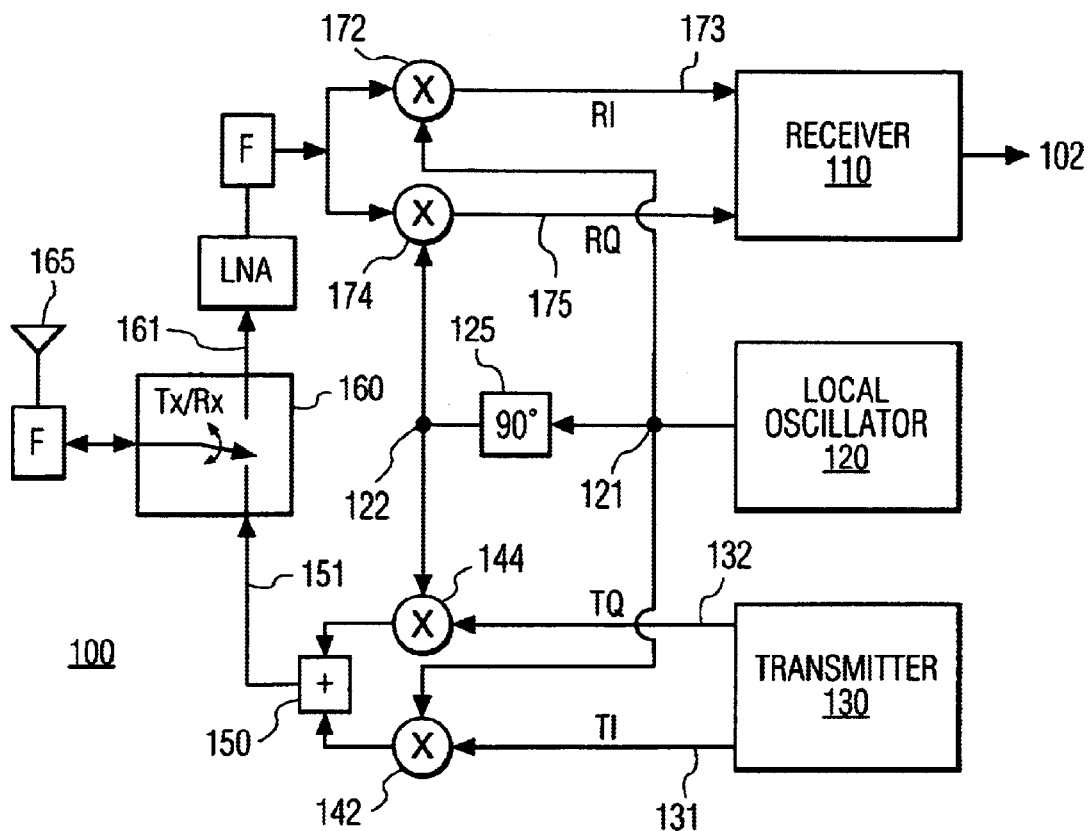
FIG. 1 illustrates an example block diagram of a prior art time-division-duplex transceiver having a common local oscillator.
Figure 2:
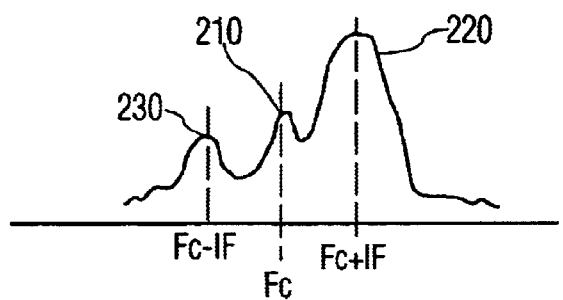
FIG. 2 illustrates an example spectral diagram of a prior art quadrature-phase transmitter with a non-ideal relationship between quadrature signals.

In accordance with this invention, the characterization signal 311 provides a characterization of the unwanted image signal component, component 230 in FIG. 2, that is contained within the transmitted composite signal 151. When placed in the calibrate mode, the transmitter 330 applies the control signals 341, 342 corresponding to this unwanted image signal component to reduce the magnitude of this unwanted signal component. Conventional closed-loop feedback techniques are embodied in a preferred embodiment of this invention to minimize the magnitude of this unwanted signal component in response to the characterization signal 311. By minimizing the magnitude of the unwanted image signal component in the composite signal 151, the degree of filtering required at the transmitter 130 or a distant receiver (not shown) to provide an undistorted representation of the originally input information 201 can be substantially reduced. In like manner, by minimizing the magnitude of the unwanted image signal component in the composite signal 151, the intermediate frequency used by the transmitter 330 and receiver 310 can be low. These and other advantages of a suppression of the unwanted image signal component in a transmitted composite signal will be evident to one of ordinary skill in the art.

Note that, to achieve these advantages, the characterization signal 311 must correspond substantially to a characterization of the unwanted signal component, and the sensitivity of the receiver must be sufficient to detect the relatively low amplitude unwanted image signal component. A number of techniques can be utilized to provide the appropriate characterization signal 311. Two such techniques are particularly well suited for an embodiment of this invention in a transceiver that utilizes a common set of quadrature oscillation signals for modulation and demodulation.

Illustrated in FIG. 3 is an example block diagram of a system that can be configured to provide the unwanted signal component (230 in FIG. 2) in the sideband that typically contains the wanted signal component (220 in FIG. 2). The switch 320 in this preferred embodiment is configured to interchange the in-phase oscillation signal 121 with the quadrature-phase oscillation signal 122. In this manner, because the oscillation signals 321 and 322 used to modulate the transmit quadrature signals TI 131 and TQ 132 are interchanged relative to the oscillation signals 121 and 122 used to demodulate the receive quadrature signals RI 173 and RQ 175, the resultant sidebands are also interchanged in the frequency domain. By providing the formerly unwanted signal component 230 in the conventional sideband of the wanted signal component, the characterization signal 311 from the receiver 310 can be easily derived from signals that are present in a conventional receiver. For example, a conventional receiver typically contains an internal gain-control signal, commonly termed an Automatic Gain Control (AGC) signal, or a Received Signal Strength Indicator (RSSI) signal, that is used to compensate for different composite signal 161 strengths from the antenna 165. This conventionally provided signal strength indicator is structured to provide a measure of the signal strength of the intended signal component, 220 of FIG. 2. By switching the unwanted signal component 230 into the sideband that conventionally contains the intended signal component 220, this conventionally provided signal strength indicator in the receiver 310 can be utilized as the characterization signal 311. As will be evident to one of ordinary skill in the art in view of this invention, other methods of effecting this sideband switching is also feasible, for example, the receive signals RI 173 and RQ 175 can be interchanged relative to the oscillation signals 121 and 122.

Figure 4:
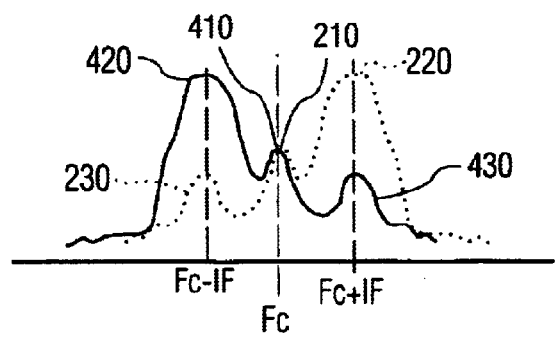
FIG. 4 illustrates an example spectral diagram of a quadrature-phase transmitter in accordance with this invention.

FIG. 4 illustrates an example spectral diagram of the quadrature-phase transmitter 300 in accordance with this invention. FIG. 4 includes the spectral response 210, 220, 230 (dashed line) corresponding to a conventional transmission, when the calibrate signal 325 of FIG. 3 is not asserted, as well as the spectral response 410, 420, 430 (solid line) corresponding to the calibrate signal 325 being asserted. Because the oscillation frequencies 321, 322 are opposite the, conventional oscillation frequencies 121, 122, the resultant spectral response 410, 420, 430 is, substantially, a mirror image of the conventional spectral response 210, 220, 230. The component 430 corresponds to the conventional unwanted signal component 230, except that it is located in the sideband at Fc+IF that conventionally contains the intended signal component 220. Because the switch 320 of FIG. 3 connects the composite output 151 corresponding to the spectral response 410, 420, 430 to the receiving demodulators 172, 174 when the calibrate control signal 325 is asserted, the conventional circuitry in the receiver 310 of FIG. 3 processes the unwanted signal component 430 as if it were the intended signal component 220, and in so doing, provides indications of the unwanted signal component 430 that are used to provide the characterization signal 311 that is used to effect a reduction in this unwanted signal component 430.

Figure 5:
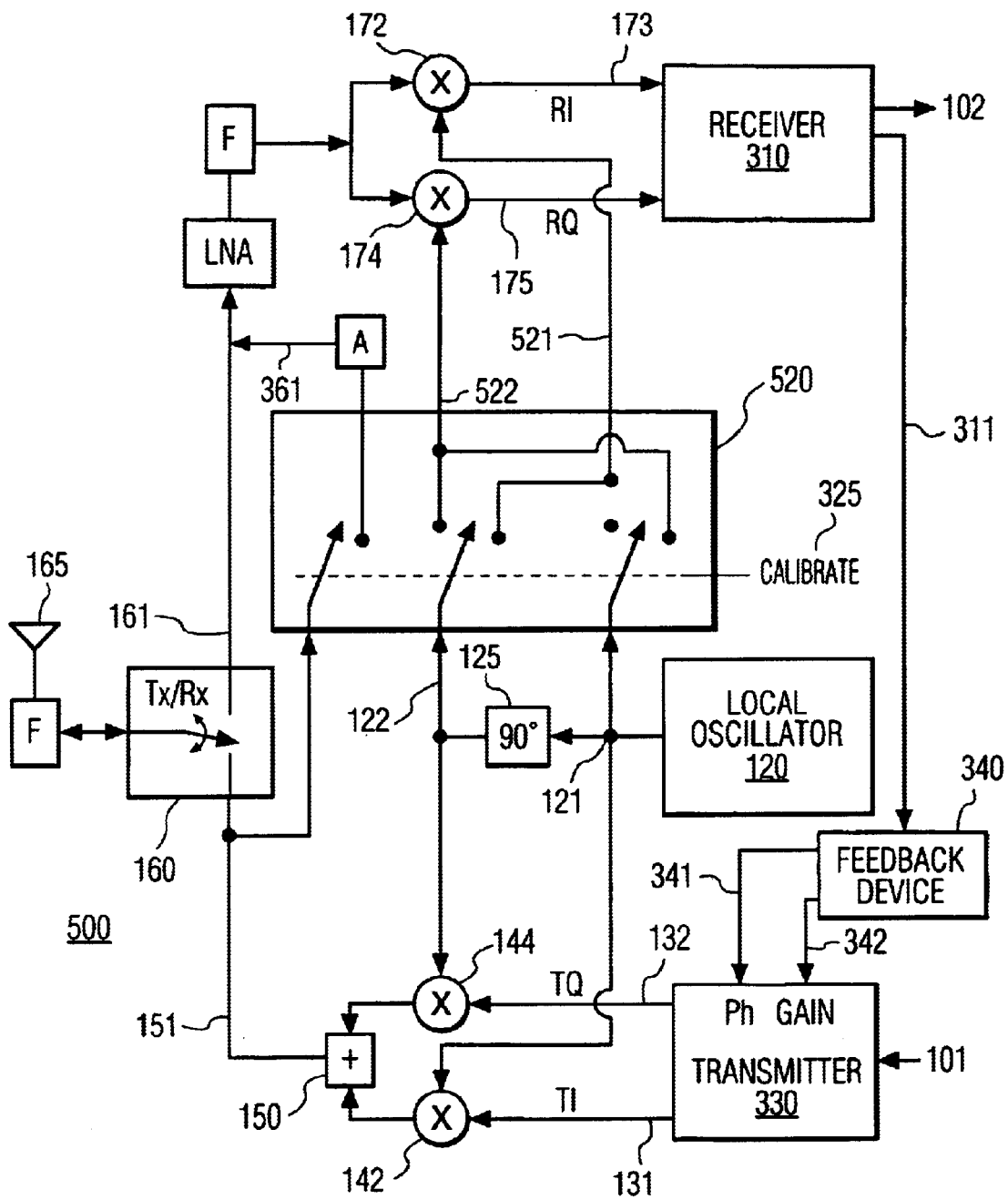
FIG. 5 illustrates an example block diagram of an alternative time-division-duplex transceiver in accordance with this invention.

FIG. 5 illustrates an example block diagram of an alternative time-division-duplex transceiver 500 in accordance with this invention. In contrast to the transceiver 300 of FIG. 3, a switch 520 is used to interchange the in-phase 121 and quadrature-phase 122 oscillation signals used by the receive demodulators 172, 174 when the calibration control signal 325 is asserted. The interchange of the in-phase 121 and quadrature-phase 122 oscillation signals to form oscillation signals 521 and 522 that are opposite the conventional relationship with the oscillation signals 121, 122 used to modulate the quadrature signals TI 131 and 132 has the effect of switching the center frequency of the receiver 310 to coincide with the sideband FC–IF that conventionally contains the unwanted signal component 230 of FIG. 2. Similar to the case of the transceiver 300, when the calibrate control signal 325 is asserted and the receiver center frequency is shifted, the conventional circuitry in the receiver 310 of FIG. 5 processes the unwanted signal component 230 as if it were the intended signal component 220, and in so doing, provides indications of the unwanted signal component 230 that are used to provide the characterization signal 311 that is used to effect a reduction in this unwanted signal component 230.

Figure 6:
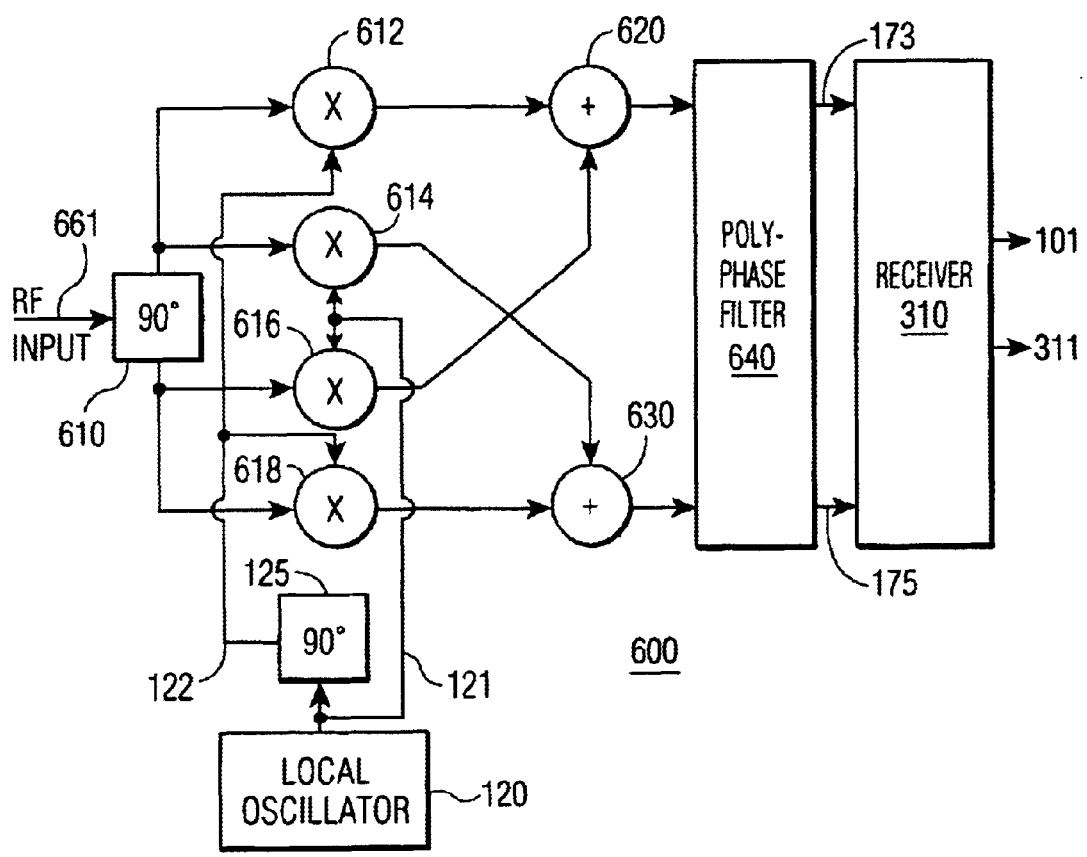
FIG. 6 illustrates an example block diagram of a double quadrature module for use in a transceiver in accordance with this invention.

As noted above, the magnitude of the unwanted image signal component is relatively low, and, in a preferred embodiment, the receiver is configured to be sensitive to such low magnitude signals, and relatively insensitive to signals beyond the bandwidth of the supplied image, component 361 from the transmitter 330. FIG. 6 illustrates an example block diagram of a double quadrature module 600 for use in a transceiver 300, 500 in accordance with this invention. The double quadrature module, conventional in the art, provides a higher image rejection at the receiver, and a higher sensitivity to the unwanted image signal component, when the transceiver 300, 500 is placed in the calibrate mode. Other techniques for improving the performance and sensitivity of the transceiver would be evident to one of ordinary skill in the art in view, of this disclosure.

In particular, FIG. 6 shows an RF input 661 which is similar to the RF input provided to the demodulators 172, 174 shown in FIG. 3. However, instead of being provided directly to the demodulators 172, 174, the RF input 661 is provided to a phase shifter 610 whose output is provided to four demodulators 612, 614, 616, 618 that also receive oscillating signals 121, 122 from the local oscillator 120 in combination with the phase shifter 125. The outputs of the demodulators 612, 614, 616, 618 are selectively provides to adders 620, 630, whose outputs are filtered by a polyphase filter 640 and provided to the receiver 310 as the I and Q receive signals RI 173, RQ 175, as also shown in FIG. 3.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A transceiver comprising:

a transmitter that is configured to receive an input signal and produces therefrom an in-phase transmit signal and a quadrature-phase transmit signal, a modulator that is configured to modulate the in-phase transmit signal and the quadrature-phase transmit signal and to produce therefrom a composite signal that includes an intended signal component and an unwanted signal component, a demodulator that is selectively configured to demodulate the composite signal and to produce therefrom an in-phase receive signal and a quadrature-phase receive signal, and a receiver that is configured to receive the in-phase receive signal and the quadrature-phase receive signal, and to produce therefrom a characterization signal that is correlated substantially to the unwanted signal component of the composite signal, wherein the transceiver is configured to adjust at least one of a phase and an amplitude of at least one of the in-phase transmit signal and the quadrature-phase transmit signal, based on the characterization signal.

2. The transceiver of claim 1, further including a local oscillator that is configured to provide a first oscillation signal and a second oscillation signal, and wherein the phase of the least one of the in-phase transmit signal and the quadrature-phase transmit signal is adjusted by modifying a phase relationship between the first oscillation signal and the second oscillation signal.

3. The transceiver of claim 2, further comprising a switch which is configured to interchange said first oscillation signal and said second oscillation signal to form a first interchanged oscillation signal and a second interchanged oscillation signal; wherein said modulator produces said composite signal in response to one of said first oscillation signal and said second oscillation signal and said first interchanged oscillation signal and said second interchanged oscillation signal, and said demodulator demodulates said composite signal in response to another of said first oscillation signal and said second oscillation signal and said first interchanged oscillation signal and said second interchanged oscillation signal.

4. The transceiver of claim 1, further comprising:

a double quadrature module that provides a high image rejection at the receiver, thereby providing a high sensitivity to the characterization signal.

5. The transceiver of claim 1, wherein the intended signal component is located at a first sideband frequency, the unwanted signal component is located at a second sideband frequency, and the transceiver further includes a switch that is configured to effect a frequency change at the receiver such that the receiver is centered at the second sideband frequency.

6. The transceiver of claim 5, further including a local oscillator that is configured to provide an in-phase oscillation signal and a quadrature-phase oscillation signal, and wherein
   the demodulator is configured to demodulate the composite signal based on the in-phase oscillation signal and the quadrature-phase oscillation signal, and
   the switch is configured to effect the tuning frequency change by interchanging the in-phase oscillation signal and the quadrature-phase oscillation signal.

7. The transceiver of claim 1, wherein
the receiver is further configured to produce the characterization signal based on a receiver tuning frequency, and
the transceiver further includes a switch that is configured to effect a change in the modulator so that the unwanted signal component is produced at the receiver tuning frequency.

8. The transceiver of claim 7, further including
a local oscillator that is configured to provide an in-phase oscillation signal and a quadrature-phase oscillation signal, and
wherein
   the modulator is configured to produce the composite signal based on the in-phase oscillation signal and the quadrature-phase oscillation signal, and
   the switch is configured to effect the change in the modulator to produce the unwanted signal component at the receiver tuning frequency by interchanging the in-phase oscillation signal and the quadrature-phase oscillation signal.

9. The transceiver of claim 1, further comprising an oscillator that is configured to form a first oscillating signal and a second oscillating signal; and a switch which is configured to interchange said first oscillating signal and said second oscillating signal to form a first interchanged oscillating signal and a second interchanged oscillating signal; said modulator being configured to receive one of said first oscillating signal and said second oscillating signal and said first interchanged oscillating signal and said second interchanged oscillating signal, and said demodulator being configured to receive another of said first oscillating signal and said second oscillating signal and said first interchanged oscillating signal and said second interchanged oscillating signal.

10. A method of suppressing an unwanted signal component from a transmission of a transceiver, the method comprising:
   receiving an input signal and producing therefrom an in-phase transmit signal and a quadrature-phase transmit signal,
   modulating the in-phase transmit signal and the quadrature-phase transmit signal and producing therefrom a composite signal that includes an intended signal component and the unwanted signal component,
   demodulating the composite signal and producing therefrom an in-phase receive signal and a quadrature-phase receive signal,
   receiving the in-phase receive signal and the quadrature-phase receive signal, and producing therefrom a characterization signal that is correlated substantially to the unwanted signal component of the composite signal,
   and adjusting at least one of a phase and an amplitude of at least one of the in-phase transmit signal and the quadrature-phase transmit signal, based on the characterization signal, to suppress the unwanted signal component.

11. The method of claim 10, wherein
the intended signal component is located at a first sideband frequency,
the unwanted signal component is located at a second sideband frequency, and
the method further includes
   changing a receiver center frequency such that the characterization signal is based on a measure of a signal that is received at the second sideband frequency.

12. The method of claim 11, further including
providing an in-phase oscillation signal and a quadrature-phase oscillation signal, and
wherein
   the demodulating of the composite signal includes
      demodulating the composite signal based on the in-phase oscillation signal and the quadrature-phase oscillation signal, and
   the changing of the receiver center frequency includes
      interchanging the in-phase oscillation signal and the quadrature-phase oscillation signal.

13. The method of claim 11, wherein
producing the characterization signal is based on the receiver center frequency, and
modulating the in-phase transmit signal and the quadrature-phase transmit signal is effected so as to provide the unwanted signal component at the receiver center frequency.

14. The method of claim 13, further including
providing an in-phase oscillation signal and a quadrature-phase oscillation signal, and
wherein
   modulating the in-phase transmit signal and the quadrature-phase transmit signal to provide the unwanted signal component at the receiver center frequency is effected by interchanging the in-phase oscillation signal and the quadrature-phase oscillation signal.

15. The method of claim 10, wherein
adjusting the phase of at least one of the in-phase transmit signal and the quadrature-phase transmit signal includes adjusting the relative phase of a first oscillation signal and a second oscillation signal that are used to effect at least one of modulating the in-phase transmit signal and the quadrature-phase transmit signal and demodulating the composite signal.

16. A transceiver comprising:
a receiver that is configured to receive first information signals,
a transmitter that is configured to transmit second information signals, and
a switch that is configured to couple the transmitter and the receiver so that the first information signals received by the receiver correspond to the second information signals that are transmitted from the transmitter during a calibration mode,
wherein
   the transceiver is configured to provide for an adjustment of at least one of a phase and a gain of the second information signals in dependence upon the first information signals that are received during the calibration mode,
   wherein said switch is further configured to interchange an I transmit signal and a Q transmit signal from a local oscillator to form a Q receive signal from said I transmit signal and an I receive signal from said Q transmit signal, said Q receive signal and said I receive signal being provided to said receiver.

17. A method of calibrating a transmitter in a transceiver that includes a receiver comprising:

transmitting a first signal via the transmitter, interchanging an I transmit signal and a Q transmit signal from a local oscillator to form a Q receive signal from said I transmit signal and an I receive signal from said Q transmit signal, receiving the first signal, said Q receive signal, and said I receive signal via the receiver to provide a characterization signal, and adjusting the transmitter in dependence upon the characterization signal.

18. The method of claim 17, wherein adjusting the transmitter includes adjusting at least one of a phase or a gain of the transmitter to facilitate reduction of unwanted signals.

19. The method of claim 17, wherein adjusting the transmitter includes adjusting a phase of one or more oscillation signals provided to said transmitter to facilitate rejection of unwanted signals.

20. A transceiver comprising:

a transmitter that is configured to transmit a first signal;

a receiver that is configured to receive a second signal which is derived from said first signal;

a local oscillator that is configured to provide a transmit oscillating signal to said transmitter and a receive oscillating signal to said receiver, wherein said transmit oscillating signal is out of phase with said receive oscillating signal so that at least one of a phase and a gain of said first signal is adjusted in dependence upon the second signal; and a switch, said transmit oscillating signal including an I transmit signal and a Q transmit signal, and said receive oscillating signal including an I receive signal and a Q receive signal; wherein said switch is configured to interchange said I transmit signal and said Q transmit signal to form said Q receive signal from said I transmit signal and said I receive signal from said Q transmit signal.

21. The transceiver of claim 20, further comprising an attenuator which attenuates said first signal to form said second signal.

22. The transceiver of claim 20, wherein said second signal includes said first signal in an attenuated form.

23. The transceiver of claim 20, wherein said switch that is configured to provide said first signal from said transmitter to said receiver as said second signal.

* * * * *